United States Patent [19]

Jeranson

[11] Patent Number: 5,274,957

[45] Date of Patent: Jan. 4, 1994

[54] BAND SAW SHARPENER

[76] Inventor: Richard C. Jeranson, 7714 Beech St NE., Fridley, Minn. 55432

[21] Appl. No.: 18,171

[22] Filed: Feb. 16, 1993

[51] Int. Cl.⁵ ............................ B24B 3/58; B24B 3/56
[52] U.S. Cl. .............................. 51/72 L; 51/166 TS; 51/170 PT; 51/173
[58] Field of Search ........................ 51/32, 34

[56] References Cited

U.S. PATENT DOCUMENTS

| | | | |
|---|---|---|---|
| 2,265,600 | 12/1941 | Hartman | 51/72 L |
| 2,568,062 | 9/1951 | Fitch | 51/34 L |
| 2,580,778 | 1/1952 | Hexter | 51/72 L |
| 2,589,165 | 3/1952 | Toy | 51/173 |
| 2,725,698 | 12/1955 | Hill | 51/173 |
| 2,859,563 | 11/1958 | Hansen | 51/38 |

Primary Examiner—Jack Lavinder

[57] ABSTRACT

A device for sharpening band saw blades while the blade is in place. A grinding disc is propelled toward and away from the saw blade to grind the teeth. While the disc is being retracted, the band is moved one tooth spacing and held there by an indexing device so that the next tooth is in position to be ground. Adjustments are provided to accommodate different spacing of the teeth in different bands. The power unit for the grinder may be a common drill motor.

13 Claims, 6 Drawing Sheets

BAND SAW SHARPENER

BACKGROUND AND SUMMARY OF THE INVENTION

This invention pertains to devices for sharpening the teeth on a band saw blade and more particularly to such a device which will sharpen those teeth without removing the band from the pulleys and without requiring manual movement of the blade.

Band saws are commonly used both by woodworkers and by meat cutters. The straight line movement of the blade through the material being cut combined with a relatively narrow blade makes possible a quick, relatively clean cut at the same time allowing for changes in direction of the cut so that curing cuts may be made if desired.

However, the narrow blade and its installation over two pulleys makes removal of the blade for sharpening inconvenient. It is possible to remove the band, clamp that band in a vise and file or grind the teeth. However, that procedure would require multiple resetting of the band in the vise until the entire saw had been sharpened, and it seems customary merely to replace the saw band rather than attempting to re-sharpen it.

By the present invention it becomes easy to resharpen the band saw blade. By simply mounting the new device on the saw table, the blade will be moved tooth by tooth past a grinder which will sharpen each tooth in turn until the entire blade has been ground. Simple removal of the sharpening device then leaves the saw ready for use.

DESCRIPTION

Figure 1:
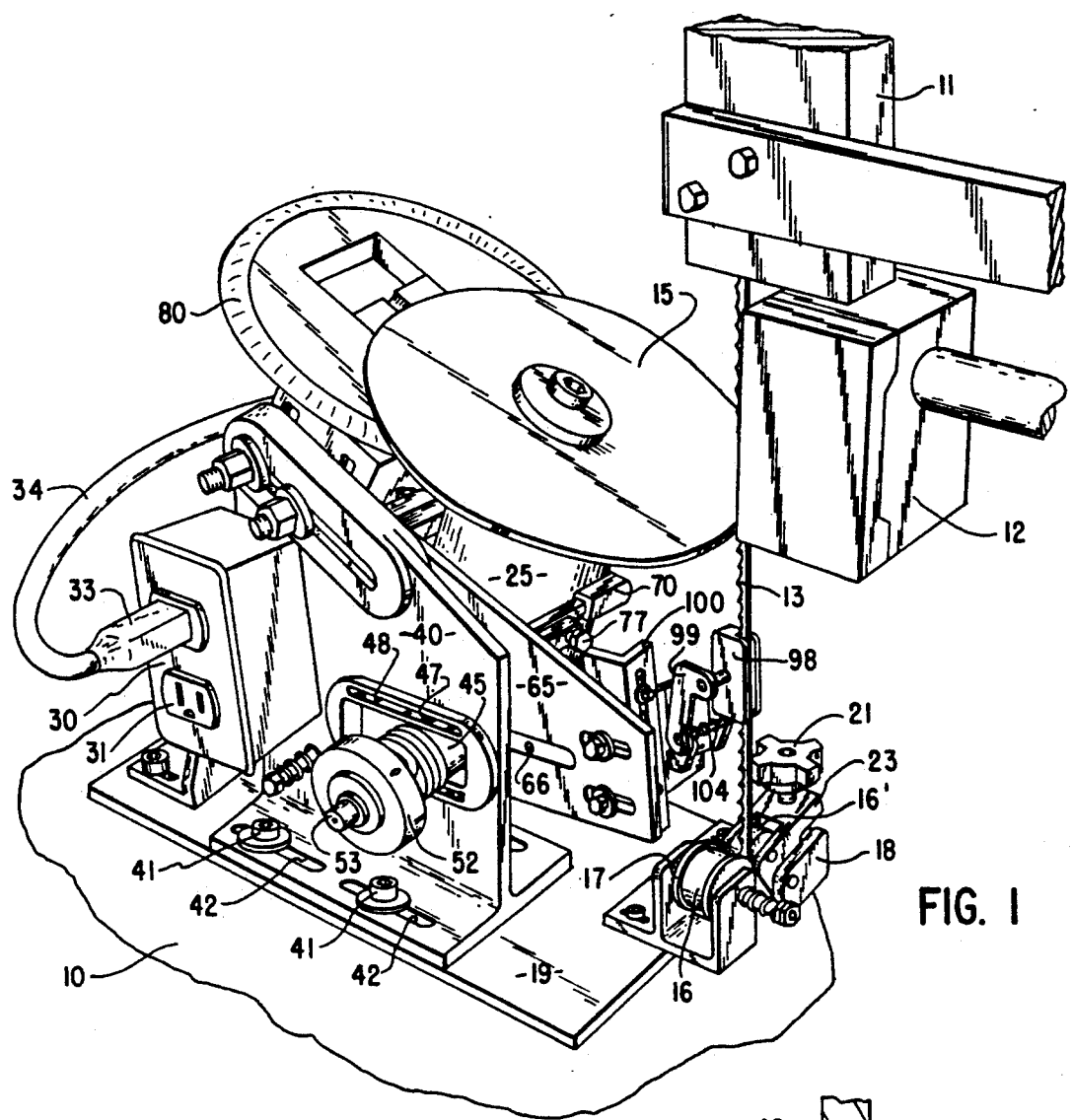
FIG. 1 is a perspective view of the device from the side adjacent the blade.

Briefly, this invention comprises a jig-like tool for placement on the table of a band saw. The tool includes grinding means for grinding each tooth of the saw blade and includes a method of indexing the blade past the grinding means. More specifically and with reference to the drawings, the device is adapted to stand on the table 10 of a band saw having a frame 11 and a guide 12 to guide the blade 13. The placement is such that the grinding wheel 15 of the device will reach the blade 13. This placement may be assisted by being certain that the blade 13 passes between the guide wheels 16 and 16'. At least one of these wheels includes a rim 17 forming a shoulder against which the blade 13 runs and is held from movement in a direction away from the teeth on the blade.

The second wheel 16' is adapted to hold the blade within that shoulder and may include an adjustment device to accommodate differing thickness of blade. The adjustment device includes a block 18 mounted on the base 19 of the device which receives an adjustment screw 20 having a knob 21 for manual adjustment. The saw blade is threaded past a pivotal holder 23 on which the wheel 16' is journalled. Thus, the wheels 16 can be separated or pressed toward each other by turning the knob 21 and therefore the screw 20.

Figure 10:
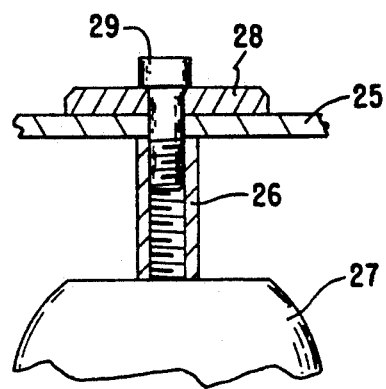
FIG. 10 is a sectional view of the cam driving pulley from line 10—10 of FIG. 6.

The grinding wheel 15 must be driven by a power unit. The preferred power unit is an ordinary electric hand drill motor unit 25 because of its general availability in workshops which would have band saws. The grinding wheel 15 has a shank 26 which is held in the chuck 27 of the drill motor. As will be explained, there may be a need for shanks 26 of different diameters. Therefore, the structure shown in FIG. 10 is preferred. As shown there, the shank 26 is held in the chuck 27. The grinding wheel 25 is clamped between the shank 26 and a washer 28 by use of a screw 29. This screw is threaded into the shank 26 in a direction opposite to the rotation of the chuck. (In almost all instances the ordinary right-hand screw threads will be proper.)

Power to the motor may be supplied simply by mounting an electrical box 30 having the ordinary outlets 31 on the device. Thus the plug 33 on the drill motor cord 34 can be plugged into one of the outlets. Power to the box is supplied through a cord 36 which may be plugged into or connected to a power source not shown.

The drill motor 25 is held in a special mounting. That mounting includes the base 19 which has feet 39 adapted to stand on the table 10. These feet are preferably not fixed to the table 10, but should avoid slippage as much as possible. Some slippage may be tolerated because the interaction between the wheels 16 and the blade 13 holds the blade and grinding wheel in proper relation. However, it is desirable to hold the device in place on the table 10 as much as possible commensurate with easy portability of the device.

A vertical plate 40 is mounted on the base 19 with a plurality of screws 41 extending through slitted openings 42 (FIG. 1) thus allowing adjustment of the position of the plate 40 relative to the base 19. This, in turn, adjusts the position of the plate 40 relative to the wheels 16 and thus the saw blade 13.

Figure 2:
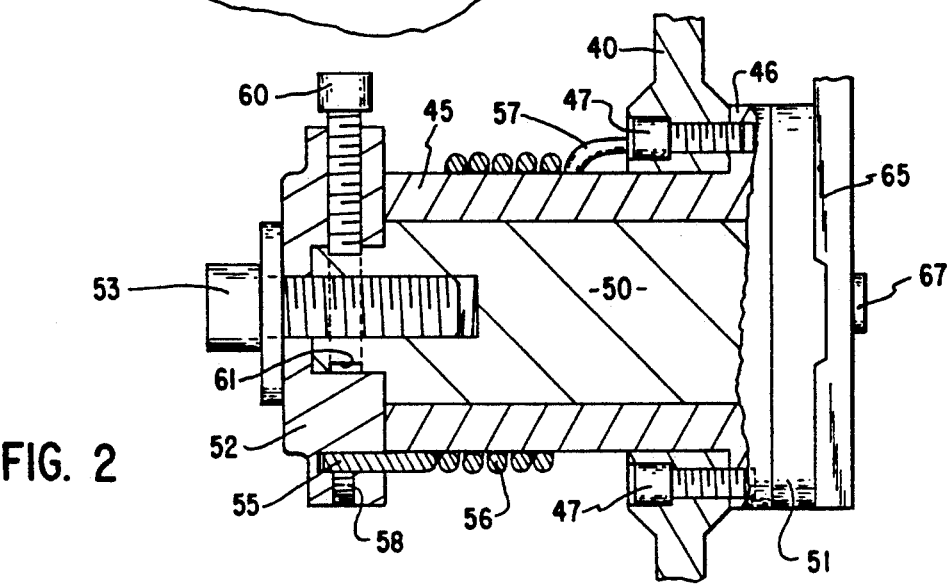
FIG. 2 is a detailed view to an enlarged scale of the spring mechanism which biases the grinding wheel toward the saw blade.
Figure 3:
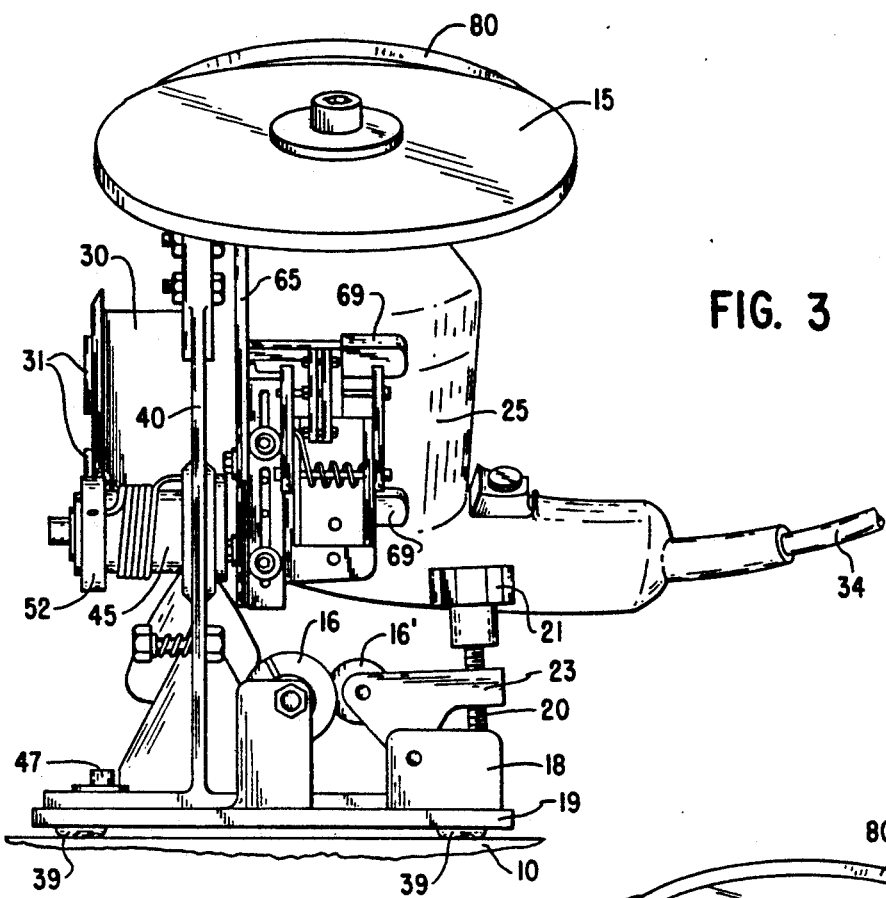
FIG. 3 is a front elevational view of the sharpener from the side of the saw blade.
Figure 4:
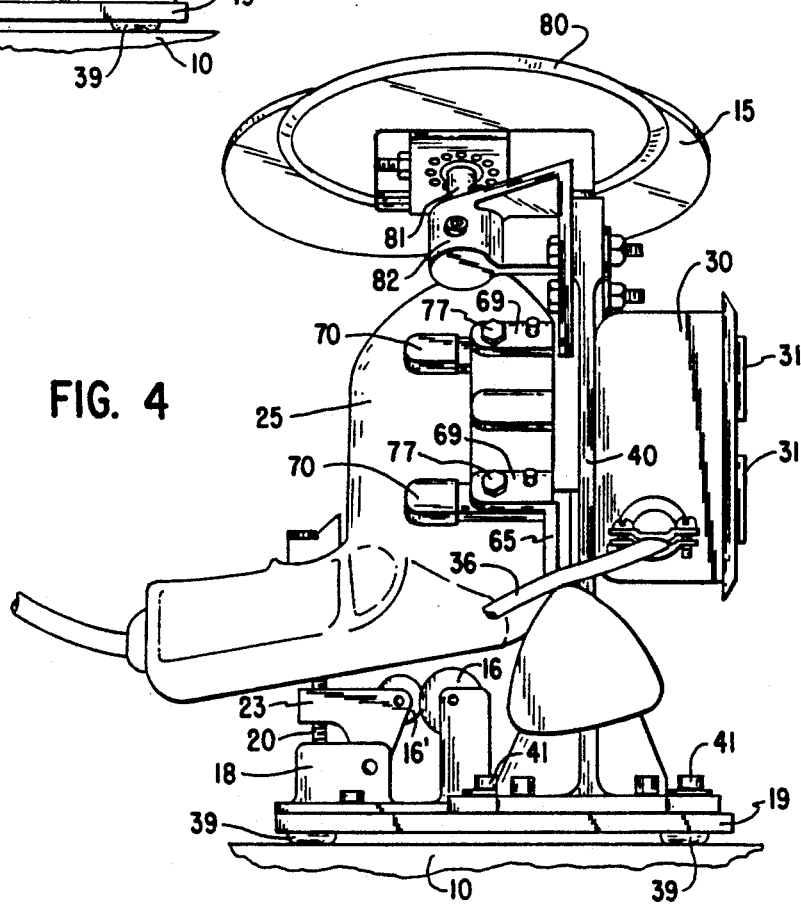
FIG. 4 is a rear elevational view of the sharpener.

The grinding wheel 15 must be moved toward and away from the saw blade 13 to be sharpened. The means to provide for such motion includes a pivoting device by which the drill motor 25 is pivoted toward and away from the blade. That pivoting device includes a shaft assembly shown in FIG. 2 which includes a housing 45 having a flange 46 into which screws 47 are threaded. These screws extend through slots 48 (FIG. 1) in the plate 40. Thus the housing is horizontally adjustable to the base 19 and thus to the blade 13.

Journalled in the housing 45 is an axle 50 carrying a keyed plate 51 at one end. At its other end, the axle carries a cap 52 bolted to the axle by a screw 53. This cap has two functions. First, if holds the axle 56 in a fixed axial position within the housing 45. The second and more important function is to hold one end 55 of a torsion spring 56. The other end 57 of the spring is held in a hole in the plate 40. The first end 55 may be fixed in the cap 52 by a set screw 58. The torsional force of the spring may be adjusted by turning the cap 52 on the shaft 50 and then fixing the cap in its relative position on the shaft 50 by tightening the set screw 60 against the shaft and in a groove 61.

Figure 11:
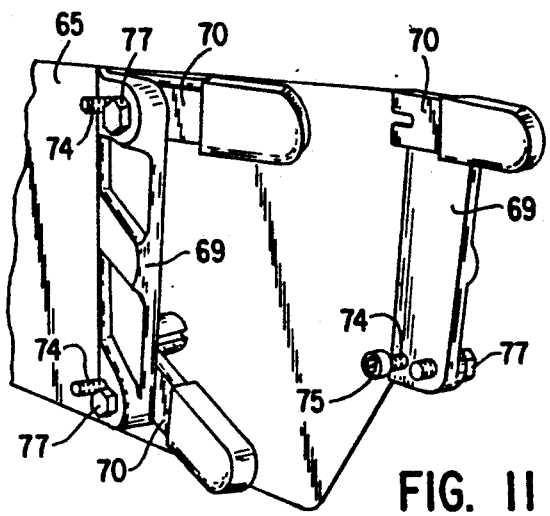
FIG. 11 is a detailed perspective view of a possible motor holding mechanism.
Figure 12:
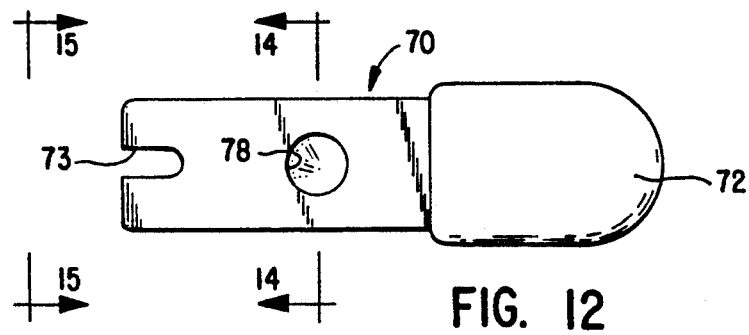
FIG. 12 is a detailed plan view of one of the fingers of the mechanism of FIG. 11.
Figure 13:
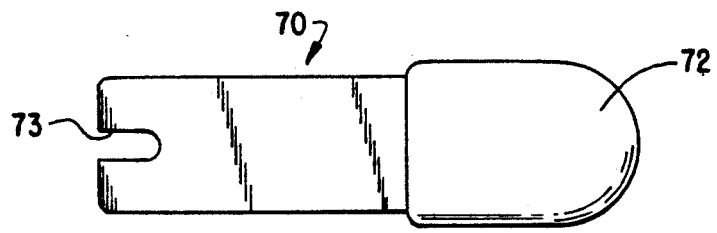
FIG. 13 is a view similar to FIG. 12 of the opposite surface of the finger shown in FIG. 12.
Figure 14:
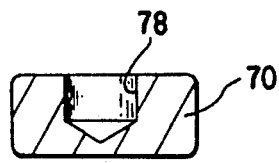
FIG. 14 is a sectional view from line 14—14 of FIG. 12.
Figure 15:
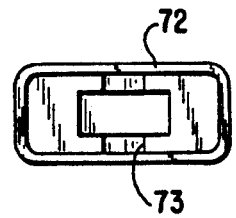
FIG. 15 is an end elevational view from line 15—15 of FIG. 12.

A mounting plate 65 for the drill motor holder is keyed to the plate 51. For adjustments, this plate may have a series of holes 66 (FIG. 1) through which a screw 67 may extend to hold the plate 65 to the axle 50. The plate 65 includes ears 69 (FIG. 11) in which holding fingers 70 may be set to grip the drill motor 25. Each finger 70 includes a metal core 71 having a plastic cover 72. This cover is adapted to contact the sides of the drill motor and hold it securely without damage to its appearance or the structure of the motor. Each finger is formed with a slot 73 at one end for attachment to the ears 69. The slot may slide over a screw 74 and beneath the head 75 of that screw (FIG. 11). Clamping of the fingers onto the drill motor is accomplished by using screws 77 which run into sprockets 78 in the finger 70. Thus, tightening the screw 77 tends to push the finger 70 so that the cover 72 will press tightly against the body of the drill motor 25.

Because the mounting plate 65 for the motor 25 is fixed to the axle 50, the drill motor can be pivoted around the axis of that axle. Control of that pivoting is done partly by the spring 56 which urges the axle 50 and its attached parts in a direction away from the saw blade 13. Thus, without control, the grinding wheel 15 would not be in contact with the blade 13. The mechanism to urge the wheel 15 against the blade includes a cam wheel 80 journalled on a fixed axle 81. The axle 81 is fixed to a bracket 82 which may be adjustably bolted to the plate 40. Adjustment is possible by using slots 83 through which extend the bolts 84 holding the bracket to the plate 40. Adjustments of the position of this bracket 82 are highly desirable in the device because of differences in size and shape of drill motors 25 which may be used alternatively.

Figure 8:
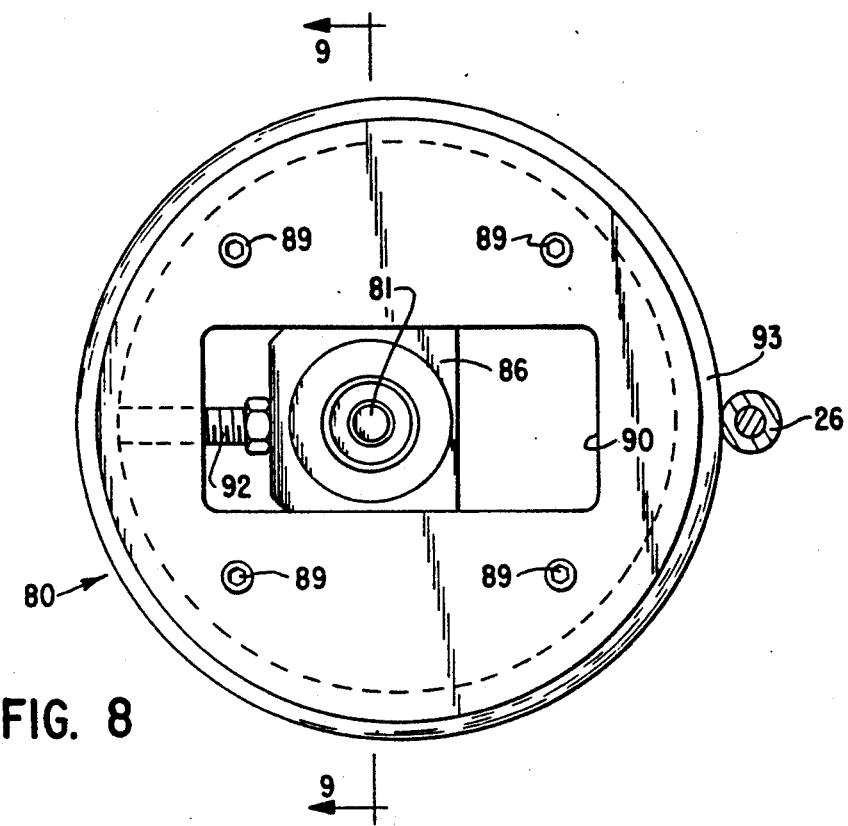
FIG. 8 is a detailed top plan view of the cam wheel from line 8—8 of FIG. 5.
Figure 9:
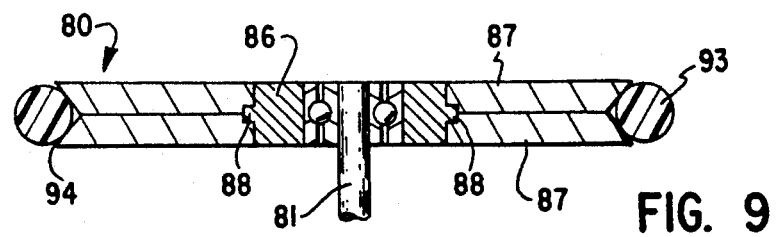
FIG. 9 is a sectional view from line 9—9 of FIG. 8.

The cam wheel 80 to be effective in moving the grinding wheel 15 towards the blade 13 is mounted eccentrically on the axle. One convenient way of accomplishing this for a variety of drill motors and grinding wheels is to pivot a central block 86 on the axle 81 and to provide for a slidable mounting of the block 86 relative to the wheel 80. The preferred construction is to form the wheel 80 of two plates 87 (FIG. 9). Tongues 88 on the block 86 engage in grooves formed between the two plates 87 and can be clamped firmly there by tightening the screws 89 (FIG. 8) that hold the plates 87 together. Thus, when the screws 89 are loosened, the block 86 can slide freely back and forth within an opening 90 (FIG. 8) formed in the plates 87 that form the wheel 80. Fine adjustment of the location of the block 80 within the opening 90 may be controlled by a screw threaded device 92 shown in FIG. 8.

The wheel 80 is rotated by engagement between the shank 26 driven by the drill motor and a rubber (or similar) tire 93 engaged in a groove 94 formed between the two plates 87. It will be apparent that as the wheel 80 rotates eccentrically about its fixed axle 81, the distance between that axle and the shank 26 will vary. Because the axle 81 is fixed, the drill motor 25 must move. As it moves, the motor 25 carries the grinding wheel 15 towards and away from the blade 13. Proper adjustment will cause the grinding wheel to properly grind the teeth on the blade.

Indexing of the teeth of the blade to ensure proper grinding of each tooth is essential to the operation of the device. This indexing is readily accomplished because of the tilting motion of the grinding wheel 15. It will be noted that as the grinding wheel moves toward the blade 13, the periphery adjacent the blade tends to move downward and conversely as it is withdrawn, the periphery of the wheel 15 moves upward. It is this motion which is used to accomplish the indexing.

Figure 5:
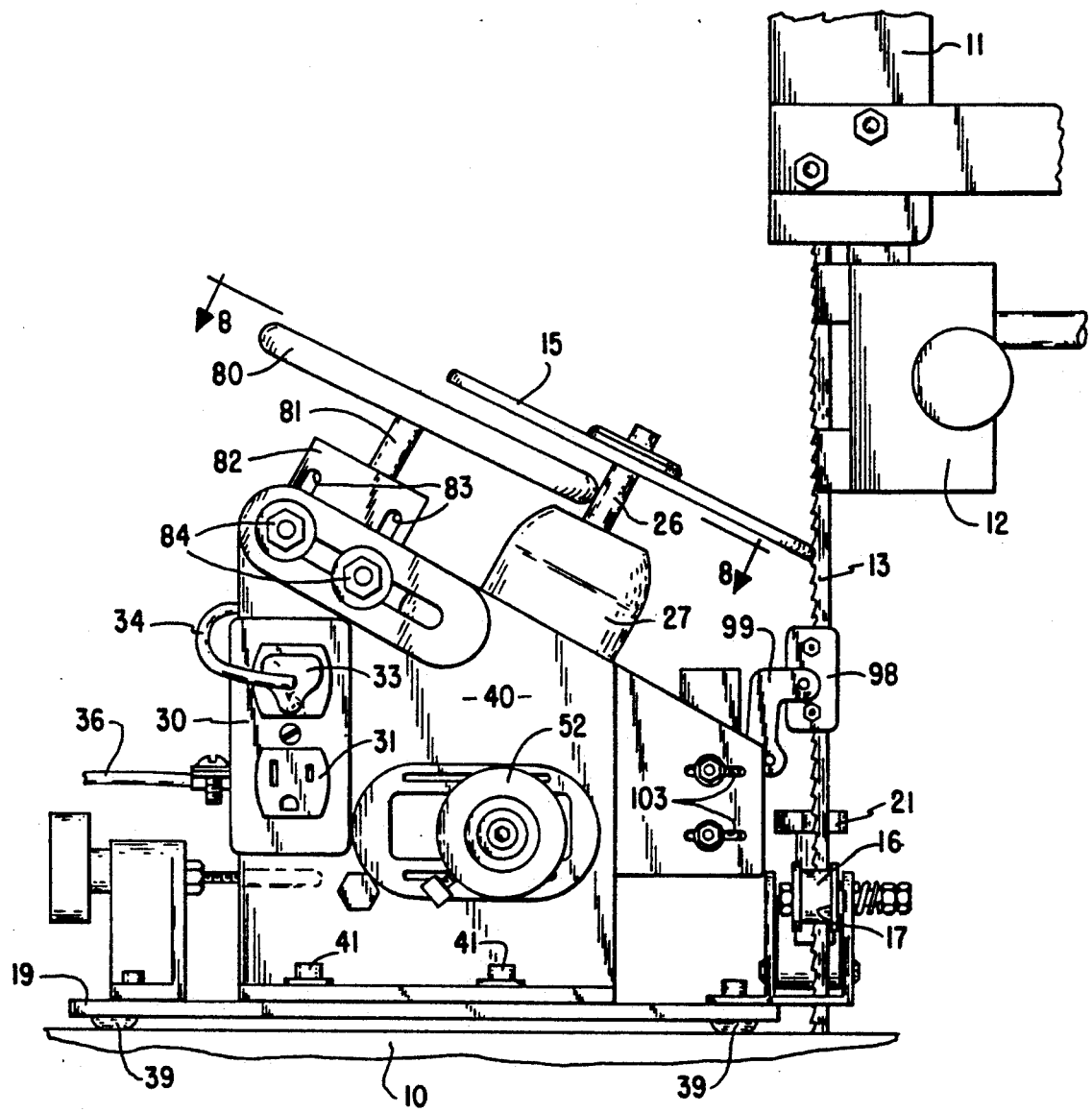
FIG. 5 is a side elevational view of the sharpener from one side.
Figure 6:
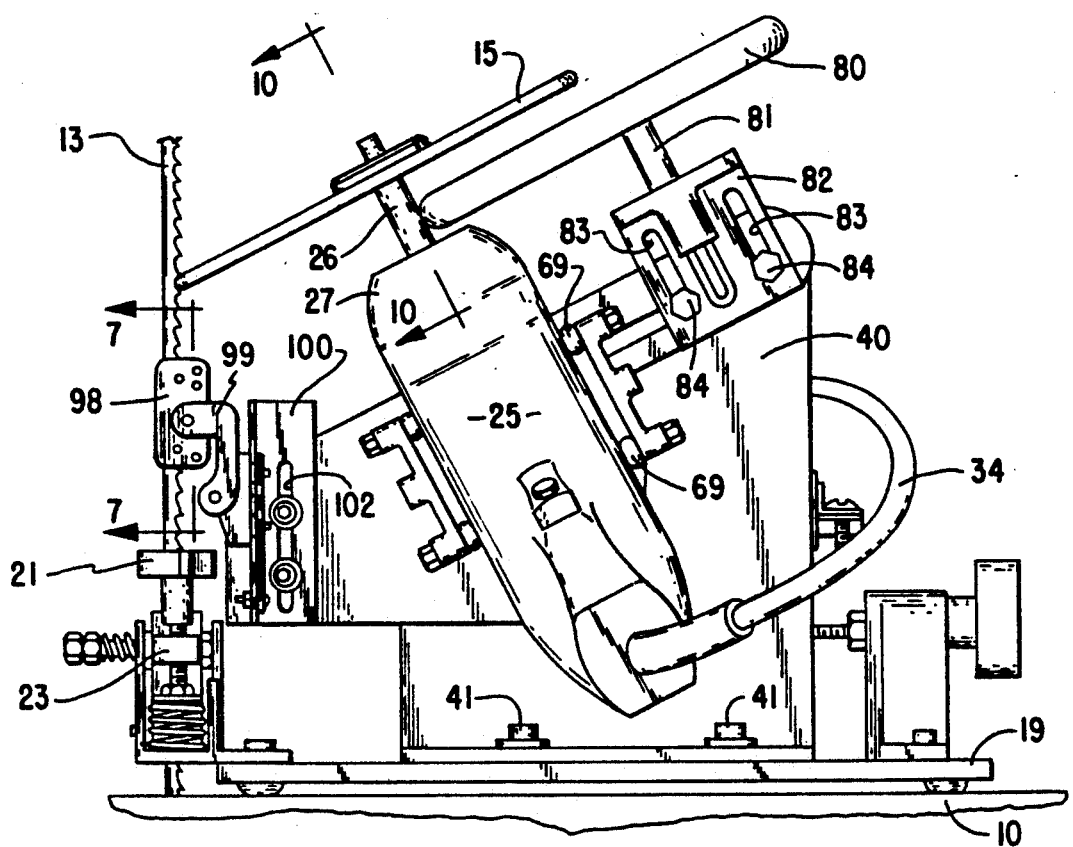
FIG. 6 is a side elevational view from the side opposite that of FIG. 5.
Figure 7:
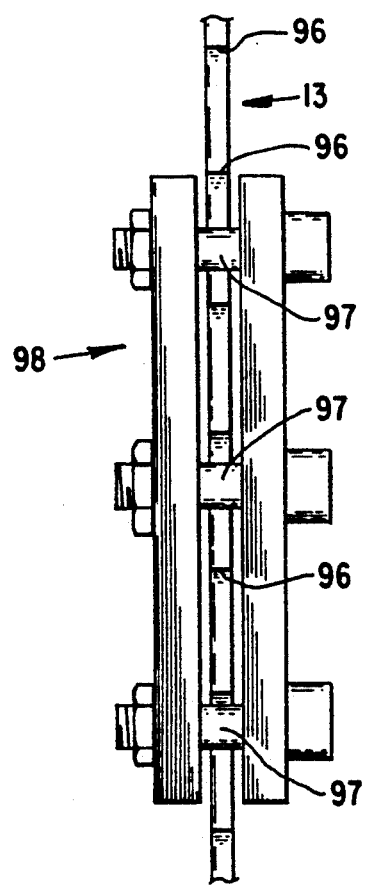
FIG. 7 is a detailed view to an enlarged scale from line 7—7 of FIG. 6.

The initial location of the blade 13 may be set by engagement of the sharpened facet of the teeth 96 (FIG. 7) with the cross members 97 of an indexing clip 98. This clip is located so that the sharpened facet of a tooth when in that position will be engaged by the grinding wheel 15. The clip 98 is composed of a grooved member adapted to receive the blade 13. It is held by a link 99 pivoted at one end of the clip 98 and at its other end to an extension 100 of the plate 40. Adjustments are also provided for this extension by both vertical slotted openings 102 (FIG. 6) and horizontal openings 103 (FIG. 5). In order to hold the cross members 97 against the blade 13, a spring 104 (FIG. 1) may be used to bias the clip 98 in that direction.

Because the normal direction of movement of the blade 13 when cutting would be downward, the sharpened facet would face downward. Then, the contact between the grinding wheel 15 and the facet of the blade would be on the upper surface of the wheel. As the tooth is being ground and sharpened, the grinding wheel moves first toward the blade and then away. As the motion is away, the periphery of the grinding wheel 15 adjacent the blade is upward against the tooth. This motion is enough to move the blade 13 upward by the spacing of about a single tooth so that the teeth are carried past the cross members 97 of the clip 98 and are then held in the new position until the grinding wheel again as fully retracted and is advanced again to the next tooth, thus indexing that next tooth until the entire blade has been sharpened.

Although the embodiment of the invention has been described in detail with a plurality of adjustments, it will be recognized that for any particular installation some of the adjustments will be less desirable than others and some may even become unnecessary. Thus, if a single drill motor is always to be used, some of the adjustment to accommodate the drill motor and the cam wheel may be unnecessary. Also, for a given blade 13, the eccentricity of the cam wheel may always be the same so that any further adjustment there may be obviated. Similar conditions may pertain as to other adjustments. However, for the maximum flexibility possible the complete panoply of adjustments is desirable.

I claim as my invention:

1. For use in sharpening saw teeth on the blade of a band saw, said saw including a table having a slot formed therein through which said blade extends; a sharpening device including a base adapted to be set on said table, power driven grinding means including a grinding wheel, said grinding means being movably mounted on said base for movement in directions toward and away from said blade, and cam means engaged with and powered by said grinding means adapted to move said grinding means in said directions.

2. The sharpening device of claim 1 in which said grinding means is tiltably mounted on said base whereby said movement toward and away from said blade also has a vertical component, said wheel being engageable with the cutting edge of said teeth, said wheel when moving vertically being adapted to lift said tooth, and indexing means mounted on said base and engageable with said teeth to index said blade one tooth upward with each movement of said wheel away from said blade.

3. The sharpening device of claim 1 in which said cam means includes an eccentric wheel rotatably mounted relative to said base, said grinding means including a rotating shank engaging the periphery of said eccentric wheel to drive said eccentric wheel, the eccentricity of rotation of said wheel being effective to move said grinding means.

4. The sharpening device of claim 3 in which said eccentric wheel is formed with a central opening, block means slidably mounted in said opening, said block means including an axle for said eccentric wheel and eccentricity of said eccentric wheel thus being adjustable by sliding said block means within said opening.

5. The sharpening device of claim 3 in which said eccentric wheel is journalled on an axle, said axle being fixed to a bracket adjustably mounted on said base.

6. The sharpening device of claim 1 in which said grinding means includes mounting means and powered means, said mounting means including a plate pivotally mounted relative to said base, holding means on said plate adapted to releasably hold said powered means whereby said powered means may be readily held to and released from said plate.

7. The sharpening device of claim 6 in which said powered means includes a motor adapted to be held by said holding means, said motor including a driven chuck, shank means held by said chuck and adapted to engage said cam means to drive said cam means, a grinding wheel mounted on said shank means, said grinding wheel then being adapted to be moved into and out of engagement with said blade.

8. The sharpening device of claim 7 in which said motor is an electric motor having a cord for supply of power to said motor, outlet means on said base connectible to a source of electrical power whereby plugging of said cord into said outlet will make said motor readily removable from said base.

9. The sharpening devices of claim 6 in which said mounting means is adjustable relative to said base.

10. For use in sharpening saw teeth on the blade of a band saw, said saw including a table having a slot formed therein through which said blade extends substantially vertically; a sharpening device including a base adapted to be set on said table, plate means on said base extending substantially perpendicular thereto, axle means adjustably mounted on said plate means, grinding means on said axle means adapted to be tilted toward and away from said blade, cam means on said plate in contact with said grinding means, said grinding means being adapted to drive said cam means, said cam means being effective to move said grinding means tiltably into contact with said teeth and indexing means on said plate adapted to hold said blade releasably in position as each tooth is ground.

11. The sharpening device of claim 10 in which said axle means includes a spring engaged with said plate to bias said axle means to carry said grinding means in a direction away from said blade, said cam means being effective to move said grinding means against the bias of said spring.

12. The sharpening device of claim 11 in which said cam means includes a bracket adjustably connected to said plate, a cam axle fixed to said bracket, a cam wheel rotatably journalled on said cam axle in position to contact said grinding means, said cam wheel being eccentrically journalled on said cam axle whereby said grinding means will be tiltably moved through its contact with said wheel.

13. The sharpening device of claim 12 in which said grinding means includes a drive motor releasably attached to said axle means, said motor having a drive chuck, a grinding wheel having a shank releasably held in said chuck, said shank being contacted by said cam wheel whereby the eccentricity of said cam wheel acting on said shank causes motion of said grinding means.

* * * * *